United States Patent
Duale et al.

(10) Patent No.: US 9,798,597 B1
(45) Date of Patent: Oct. 24, 2017

(54) VERIFYING SELECTIVE PURGING OF ENTRIES FROM TRANSLATION LOOK-ASIDE BUFFERS

(71) Applicant: International Business Machines Corporation, Armonk, NY (US)

(72) Inventors: Ali Y. Duale, Poughkeepsie, NY (US); Shailesh R. Gami, Poughkeepsie, NY (US); John L. Weber, Tilson, NY (US); Dennis W Wittig, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/275,646

(22) Filed: Sep. 26, 2016

(51) Int. Cl.
G06F 12/00 (2006.01)
G06F 11/07 (2006.01)
G06F 12/1036 (2016.01)

(52) U.S. Cl.
CPC ........ G06F 11/073 (2013.01); G06F 11/0751 (2013.01); G06F 12/1036 (2013.01); G06F 2212/1032 (2013.01); G06F 2212/152 (2013.01); G06F 2212/683 (2013.01)

(58) Field of Classification Search
CPC ............... G06F 11/073; G06F 11/0751; G06F 12/1036; G06F 2212/1032; G06F 2212/152; G06F 2212/683
See application file for complete search history.

(56) References Cited

U.S. PATENT DOCUMENTS

| 2004/0025161 | A1* | 2/2004 | Chauvel | G06F 9/30174 |
| | | | | 718/102 |
| 2006/0294288 | A1* | 12/2006 | Seth | G06F 12/145 |
| | | | | 711/6 |
| 2007/0198851 | A1* | 8/2007 | Goto | G06F 12/145 |
| | | | | 713/187 |
| 2011/0161979 | A1* | 6/2011 | Flemming | G06F 9/5077 |
| | | | | 718/105 |
| 2013/0298124 | A1 | 11/2013 | Vembu et al. | |
| 2013/0339656 | A1 | 12/2013 | Greiner et al. | |
| 2013/0339657 | A1 | 12/2013 | Greiner et al. | |
| 2014/0181360 | A1 | 6/2014 | Greiner et al. | |

* cited by examiner

Primary Examiner — Larry T Mackall
(74) Attorney, Agent, or Firm — Cantor Colburn LLP; Steven Chiu (57) ABSTRACT

An aspect includes include selective purging of entries from translation look-aside buffers (TLBs). A method includes building multiple logical systems in a computing environment, the multiple logical systems including at least two level-two guests. TLB entries are created in a TLB for the level-two guests by executing fetch and store instructions. A subset of the TLB entries is purged in response to a selective TLB purge instruction, the subset including TLB entries created for a first one of the level-two guests. Subsequent to the purging, verifying that the subset of the TLB entries were purged from the TLB, and determining whether a second one of the level-two guests is operational, the determining including executing at least one instruction that accesses a TLB entry of the second one of the level-two guests. Test results are generated based on the verifying and the determining. The test results are output.

20 Claims, 10 Drawing Sheets

VERIFYING SELECTIVE PURGING OF ENTRIES FROM TRANSLATION LOOK-ASIDE BUFFERS

BACKGROUND

The present invention relates generally to computer systems, and more specifically, to verifying selective purging of entries from translation look-aside buffers (TLBs).

SUMMARY

Embodiments include a method, system, and computer program product for selective purging of entries from translation look-aside buffers (TLBs). A method includes building multiple logical systems in a computing environment, the multiple logical systems including at least two level-two guests. TLB entries are created in a TLB for the level-two guests by executing fetch and store instructions. A subset of the TLB entries is purged in response to a selective TLB purge instruction, the subset including TLB entries created for a first one of the level-two guests. Subsequent to the purging, verifying that the subset of the TLB entries were purged from the TLB, and determining whether a second one of the level-two guests is operational, the determining including executing at least one instruction that accesses a TLB entry of the second one of the level-two guests. Test results are generated based on the verifying and the determining. The test results are output.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to verifying selective translation look-aside buffer (TLB) entry purging. Selective TLB entry purging can be utilized to reduce the amount of purging and rebuilding of guest TLB entries in a computer system that supports multiple levels of partitions and guests. One or more embodiments described herein can be utilized to perform system level testing of selective TLB purging for both uni-processor and multi-processor environments. In a uni-processor environment, host primary address space control elements (ASCEs), virtual addresses, and supporting dynamic address translation (DAT) tables are randomly generated to create unique address spaces and then utilized in an instruction stream that builds multiple guests, for example by executing Start Interpretive Execution (SIE) instructions. Once the multiple guests have been built, related TLB entries are created and selectively purged. In the multi-processor environment, different variations of two or more processors sharing the same randomly generated host primary ASCEs, virtual addresses, and supporting DAT tables are tested to verify that certain TLB entries are purged.

Figure 1:
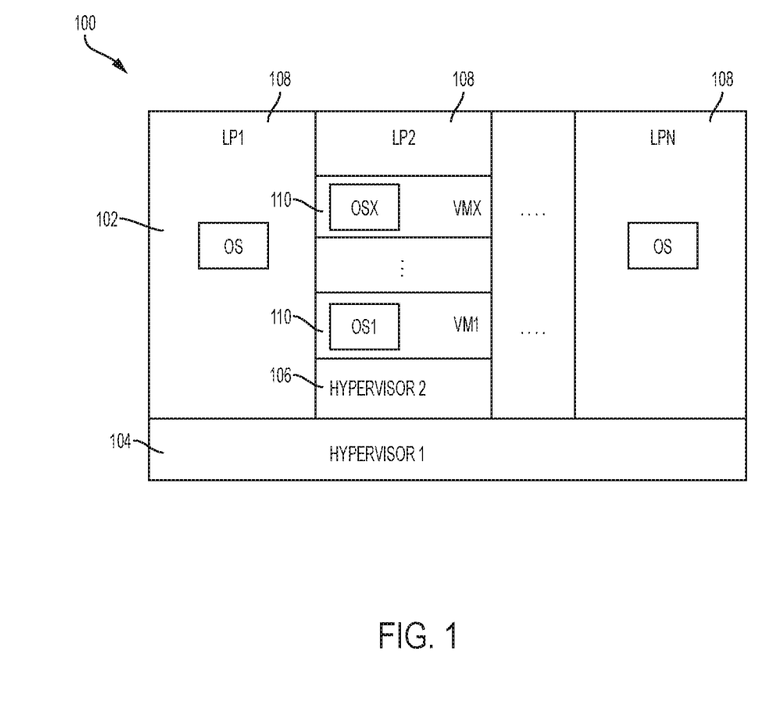
FIG. 1 illustrates a block diagram of a computing environment for verifying selective translation look-aside buffer (TLB) purging in accordance with one or more embodiments.

Turning now to FIG. 1, a block diagram of a computing environment 100 for verifying selective TLB purging is generally shown in accordance with one or more embodiments. The computer environment 100 shown in FIG. 1 includes a first level hypervisor 104 that manages logical partitions 108. The logical partitions 108 shown in FIG. 1 are examples of level-one guests and each corresponds to a designated area in a TLB. Also shown in FIG. 1 is a second level hypervisor 106 that manages virtual machines 110. The virtual machines 110 shown in FIG. 1 are examples of level-two guests that share the TLB assigned to their corresponding logical partition 108, in this example the logical partition 108 labeled "LP2."

Figure 2:
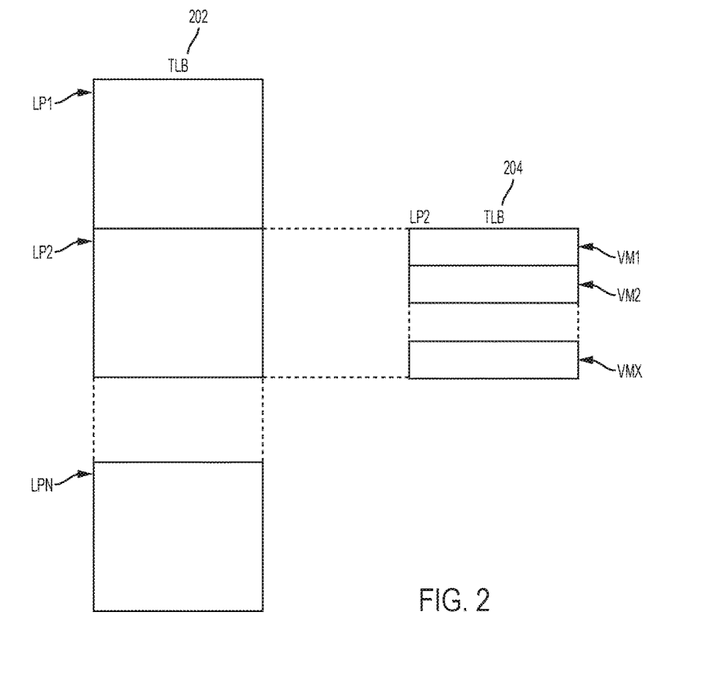
FIG. 2 illustrates a TLB in accordance with one or more embodiments.

Turning now to FIG. 2, a TLB corresponding to the computing environment 100 shown in FIG. 1 is generally shown in accordance with one or more embodiments. The TLB is stored in cache memory and contains information regarding recently performed address translations between virtual addresses and physical addresses. As shown in FIG. 2, portions of the TLB 202 are assigned to each of the logical partitions 108, or level-one guests being executed by hypervisor 1 104. Also as shown in FIG. 2, the portion of the TLB 202 assigned to the logical partition 108 labeled "LP2", shown in FIG. 2 as LP2 TLB 204 is further segmented. Portions of LP2 TLB 204 are assigned to one or more of the virtual machines 110, or level-two guests, being executed by hypervisor 2 106 in the logical partition 108 labeled "LP2."

In accordance with one or more embodiments, all of the level-two guests within a logical partition execute on the same logical processor. These embodiments are referred to herein as uni-processor environments. In one or more other embodiments, one or more level-two guests within a logical partition are executing on different logical processors. This is referred to herein as a multi-processor environment. In a multi-processor environment, a System Control Area (SCA) is used to control communication between a level-two guest that spans multiple logical or virtual processors. In one or more embodiments, each processor has its own TLB entries related to the level-two guest and both processors keep track of the common SCA assigned to the level-two guest. To ensure consistency, when TLB entries for a level-two guest are removed from a TLB on one processor, TLB entries for the level-two guest are also removed from TLBs on any other processors where the level-two guest is executing.

Figure 3:
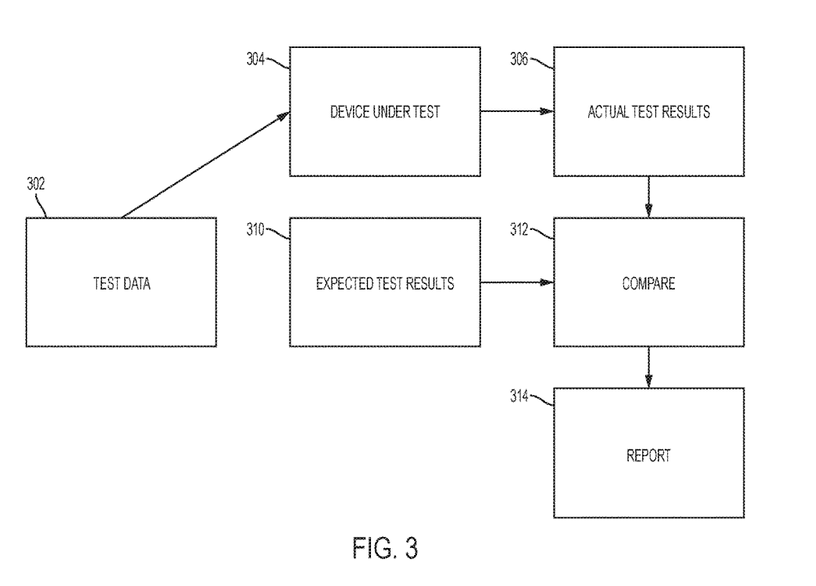
FIG. 3 illustrates a block diagram of a system for verifying selective TLB purging in accordance with one or more embodiments.

Turning now to FIG. 3, a block diagram 300 of a system for verifying selective TLB purging is generally shown in accordance with one or more embodiments. The block diagram 300 of FIG. 3 includes test data 302 (e.g., an instruction stream) that is input to a device under test 304 and actual test results 306 are output from the device under test 304. The actual test results 306 and expected test results 310 are input to compare logic 312. The results of the comparison are output as a report 314. The report 314 can indicate whether or not the actual test results 306 match the expected test results 310.

Figure 4:
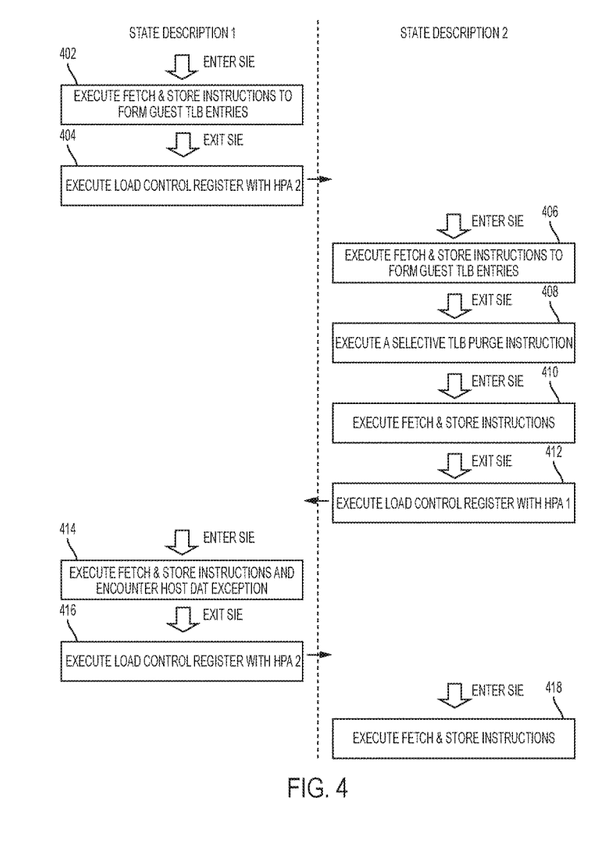
FIG. 4 illustrates a process for verifying selective TLB purging in a uni-processor environment in accordance with one or more embodiments.

Turning now to FIG. 4, a process 400 for verifying selective TLB purging in a uni-processor environment is generally shown in accordance with one or more embodiments. The process 400 shown in FIG. 4 can be implemented by test code executing on a processor. In accordance with one or more embodiments, multiple logical systems are built, and the logical systems include at least two level-two guests. As shown in FIG. 4, "State Description 1" on the left side describes a state of a first level-two guest and "State Description 2" on the right side describes a state of a second level-two guest. In accordance with one or more embodiments, a processor or host (e.g., via a hypervisor) issues a Start Interpretive Execution (SIE) instruction for the first level-two guest to enter SIE to execute an instruction stream shown in block 402 to create guest TLB entries. By entering SIE, it is meant to establish the guest as defined by its state description and begin executing the instruction stream of the guest. On the other hand, a SIE Exit ceases executing the instruction stream of the guest, preserving the state of a guest in a state description and returning control to the host. As shown in block 402, these instructions can include fetch and store instructions. The first level-two guest executes an exit instruction that causes the guest to cease executing and exit SIE, return control to the host and then executes the instruction shown in block 404 to change the HPA ("host primary ASCE" or "host primary address space control element"). This is done to prepare execution of second level-two guest instructions and build TLB entries for this guest. In a uni-processor environment, each guest has its own ASCE. For the purpose of the uni-case, each guest has its own ASCE, but the same value.

Processing continues at block 406 after the host issues the SIE instruction for the second level-two guest and the second level-two guest executes an instruction stream that forms guest TLB entries as shown in block 406. The second level-two guest exits SIE. At block 408, the host issues a dynamic address translation (DAT) table entry invalidation instruction with additional selective purging controls to invalidate a DAT table entry supporting the guest TLB entries formed in block 402.

The second level-two guest enters SIE and at block 410, executes the same instruction stream that it executed in block 406. This is part of determining whether the TLB entries for second level-two guest are not purged by the purge operations done in block 408. The second level-two guest TLB entries are intact if the instruction stream in block 410 completes successfully, that is without generating exceptions. The second level-two guest is determined to be not operational if the instruction stream in block 410 generates an error condition (due to exceptions reported by these instructions). The second level-two guest exits SIE and then executes the instructions shown in block 412 to change the HPA to indicate the first level-two guest.

The first level-two guest enters SIE and at block 414, executes an instruction stream and, if the selective purge was successful, will encounter a host DAT exception due to the host instruction in block 408 that invalidated the supporting host DAT table and purged the first level-two guest TLB entry. The first level-two guest exits SIE and then executes the instructions shown in block 416 to change the HPA to indicate the second level-two guest. The second level-two guest enters SIE and at block 418 executes the same instruction stream that it executed in block 406. This is part of determining whether TLB entries of the second level-two guest are present or not after the purging in block 408 and control being switched between the level-two guests. The TLB entries of second level-two guest are present if the instruction stream in block 418 completes successfully, that is without generating any translation exceptions. The TLB entries of the second level-two guest are determined to be purged if the instruction stream in block 418 generates translation exception.

In one or more embodiments, in a uni-processor environment, verifying selective purging of TLB entries includes randomly generating HPA, virtual addresses and supporting DAT tables to create unique address spaces and utilizing them in an instruction stream that builds multiple guests (via executions of SIE instructions) and related TLB entries which are created and selectively purged.

In one or more embodiments, in a multi-processor environment, verifying selective purging of TLB entries includes different variations where two or more processors utilize randomly generated HPAs, virtual addresses, and supporting DAT tables in SIE environments to verify that certain guest TLB entries are purged. The following verification test scenarios are intended to be non-limiting examples, as any test scenario that verifies selective TLB purging may be performed by embodiments described herein. In the examples described below, a first level-two guest can be executing on a first processor and a second processor, and a second level-two guest can be operating on a third processor and a fourth processor. The first, second, third, and fourth processors could be executing on the same level-one guest or two or more different level-one guests. In addition, the first, second, third, and fourth processors could be executing on the same physical computer or two or more different physical computers.

Figure 5:
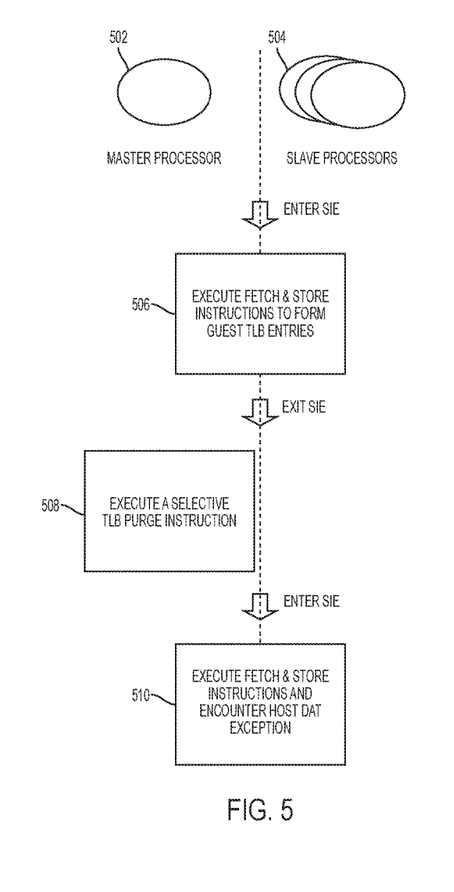
FIG. 5 illustrates a process for verifying selective TLB purging in a multi-processor environment in accordance with one or more embodiments.

Turning now to FIG. 5, a process 500 for verifying selective TLB purging in a multi-processor environment is generally shown in accordance with one or more embodiments. In the verification test performed by the process shown in FIG. 5, a level-two guest is being executed by a master processor 502 and N slave processors 504. In one or more embodiments, the verification test is successful if after, a selective TLB purge instruction is executed to remove the TLB of the level-two guest, the level-two guest encounters DAT exceptions on the master processor 502 and all slave processors 504 when attempting to access entries in the TLB. Because they are executing the same level-two guest (i.e., they share the same system control arear or "SCA"), the master processor 502 and slave processors 504 can use the same HPA to form guest TLB entries. The level-two guest enters SIE when the master processor 502 and slave processors 504 execute the SIE instruction. At block 506, the level-two guest executes an instruction stream that generates TLB entries for the master processor 502 and slave processors 504. In one or more embodiments, the master processor 502 and the slave processors 504 each have a separate TLB corresponding to the level-two guest. These TLB can vary based on a portion of the processing of the level-two guest performed on each processor. When a TLB (e.g., all TLB entries) for the level-two guest is purged from a TLB on one of the processors, it should be purged from all of the processors.

At block 508, the master processor 502 executes a host instruction stream that contains a selective TLB purge instruction. The level-two guest enters SIE on the master processor 502 and the slave processors 504, and at block 510 executes an instruction stream of fetch and store instructions and, if the selective purge at block 508 was successful, will encounter a host DAT exception.

Figure 6:
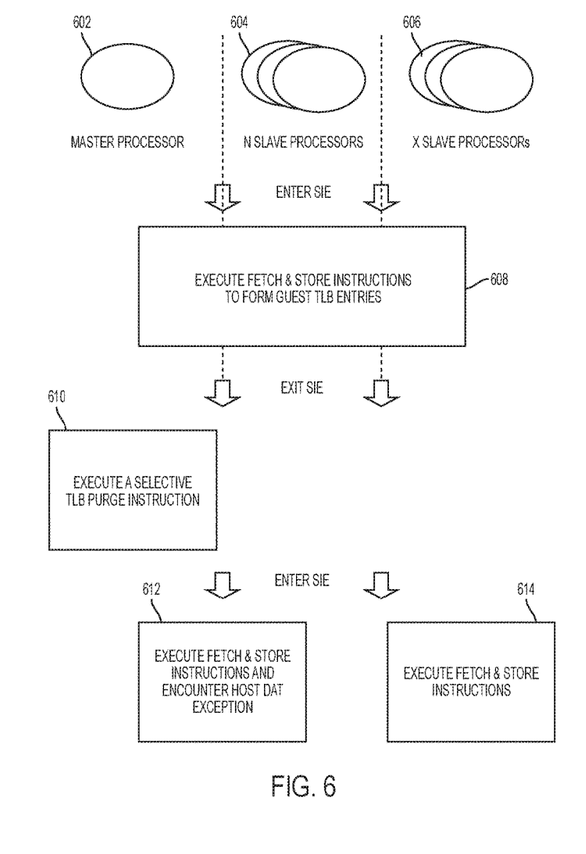
FIG. 6 illustrates a process for verifying selective TLB purging in a multi-processor environment in accordance with one or more embodiments.

Turning now to FIG. 6, a process 600 for verifying selective TLB purging in a multi-processor environment is generally shown in accordance with one or more embodiments. In the verification test performed by the process shown in FIG. 6, a first level-two guest is being executed by a master processor 602 and N slave processors 604; and a different second level-two guest is being executed by X slave processors 606. In one or more embodiments, the verification test is successful if after, a selective TLB purge instruction is executed to remove the TLB of the first level-two guest, the first level-two guest encounters DAT exceptions on the master processor 602 and all slave processors 604 when attempting to access entries in the TLB. In addition, the second level-two guest operating on X slave processors 606 should not be impacted by the purging of the TLB of the first level-two guest.

The first and second level-two guests enter SIE, and at block 608 execute an instruction stream that generates TLB entries on the master processor 602, N slave processors 604, and X slave processors 606. At block 610, the master processor 602 executes a host instruction stream that contains a selective TLB purge instruction to purge TLB entries for the first level-two guest. The first and second level-two guests enter SIE, and block 612 the first level-two guest executes an instruction stream of fetch and store instructions and, if the selective purge at block 610 was successful, the first level-two guest will encounter a host DAT exception. In addition, if the selective purge at block 610 is operating as expected, TLB entries of the second level-two guest should not be impacted by the selective TLB purge at block 610. This is verified by the second level-two guest executing fetch & store instructions at block 614.

Figure 7:
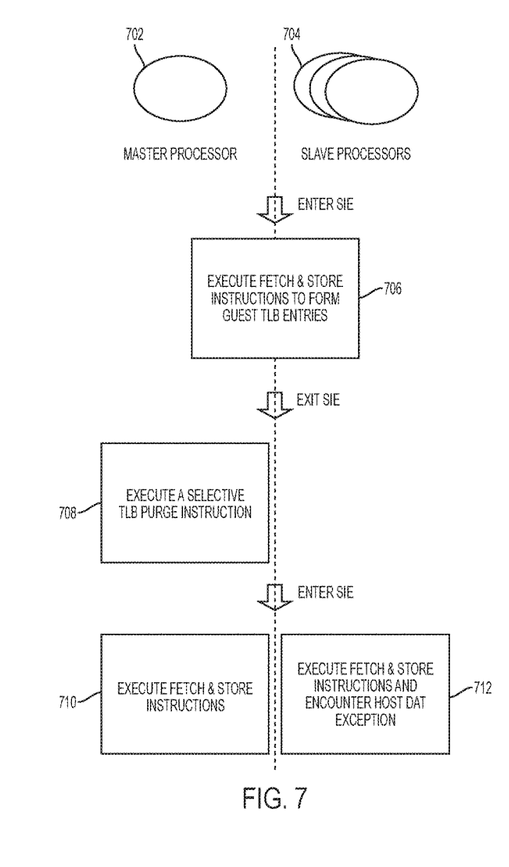
FIG. 7 illustrates a process for verifying selective TLB purging in a multi-processor environment in accordance with one or more embodiments.

Turning now to FIG. 7, a process 700 for verifying selective TLB purging in a multi-processor environment is generally shown in accordance with one or more embodiments. In the verification test performed by the process shown in FIG. 7, a first level-two guest is being executed by a master processor 702 and a second level-two guest is being executed by slave processors 704. In one or more embodiments, the verification test is successful if after, a selective TLB purge instruction is executed by the master processor 702 to remove the TLB of the second level-two guest, the first level-two guest does not encounter DAT exceptions when attempting to access entries in a TLB for the first level-two guest. In addition, the second level-two guest should encounter DAT exceptions when attempting to access entries in the TLB of the second level-two guest.

The first and second level-two guests enter SIE, and at block 706 execute an instruction stream that generates TLB entries on the master processor 702 and the slave processors 704. At block 708, the master processor 702 executes a selective TLB purge instruction to purge TLB entries for the second level-two guest. The first and second level-two guests enter SIE, and block 712 the second level-two guest executes an instruction stream of fetch and store instructions and, if the selective purge at block 708 was successful, the second level-two guest will encounter host DAT exceptions. In addition, if the selective purge at block 708 is operating as expected, TLB entries of the first level-two guest should not be impacted by the selective TLB purge at block 708. This is verified by the first level-two guest executing fetch & store instructions at block 710.

Figure 8:
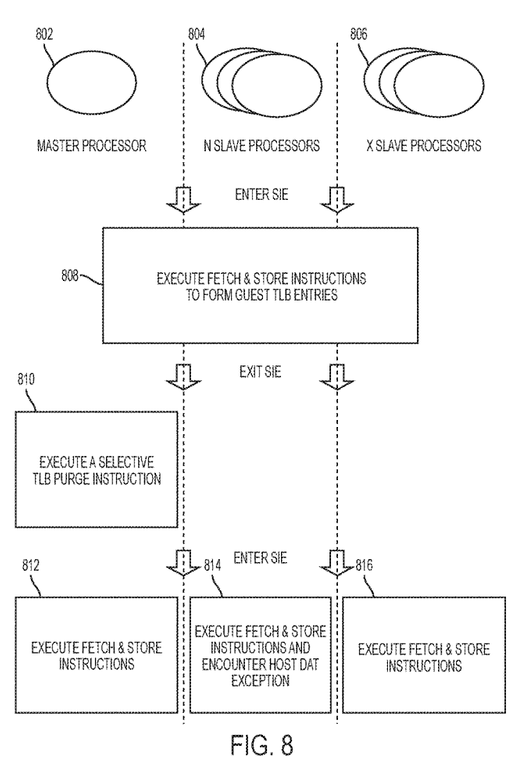
FIG. 8 illustrates a process for verifying selective TLB purging in a multi-processor environment in accordance with one or more embodiments.

Turning now to FIG. 8, a process 800 for verifying selective TLB purging in a multi-processor environment is generally shown in accordance with one or more embodiments. In the verification test performed by the process shown in FIG. 8, a first level-two guest is being executed by a master processor 802, a second level-two guest is being executed by N slave processors 804, and a third level-two guest is being executed by X slave processors 806. In one or more embodiments, the verification test is successful if after, a selective TLB purge instruction is executed to remove the TLB of the second level-two guest, the second level-two guest encounters DAT exceptions on the N slave processors 804 when attempting to access entries in the TLB. In addition, the first level-two guest operating on the master processor 802 and the third level-two guest operating on the X slave processors 806 should not be impacted by the purging of the TLB of the second level-two guest.

The first, second, and third level-two guests enter SIE, and at block 808 execute instructions that generates TLB entries for the level-two guests and then the exit SIE. At block 810, the master processor 802 executes a selective TLB purge instruction to purge TLB entries for the second level-two guest. The first, second, and third level-two guests enter SIE, and block 814 the second level-two guest executes an instruction stream of fetch and store instructions and, if the selective purge at block 810 was successful, the second level-two guest will encounter a host DAT exception. In addition, if the selective purge at block 810 is operating as expected, TLB entries of the first and third level-two guests should not be impacted by the selective TLB purge at block 810. This is verified by the first and third level-two guests executing fetch & store instructions at blocks 812 and 816.

Figure 9:
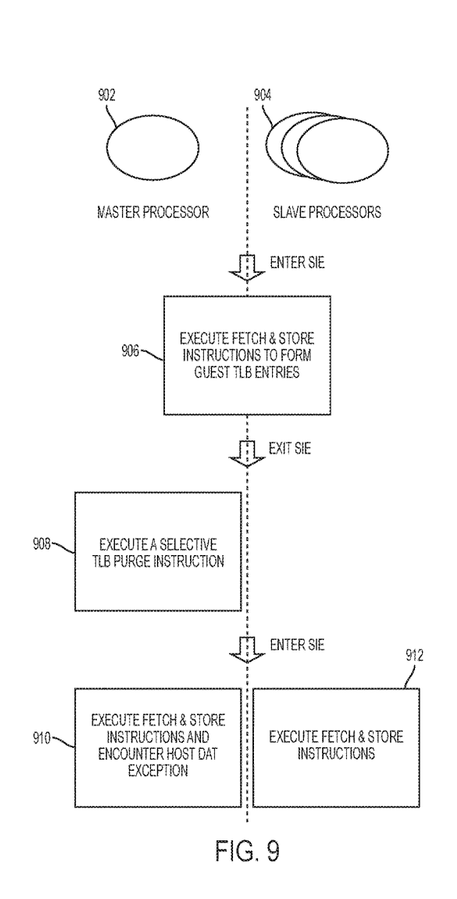
FIG. 9 illustrates a process for verifying selective TLB purging in a multi-processor environment in accordance with one or more embodiments.

Turning now to FIG. 9, a process 900 for verifying selective TLB purging in a multi-processor environment is generally shown in accordance with one or more embodiments. In the verification test performed by the process shown in FIG. 9, a first level-two guest is being executed by a master processor 902 and a second level-two guest is being executed by slave processors 904. In one or more embodiments, the verification test is successful if after, a selective TLB purge instruction is executed by the master processor 902 to remove the TLB of the first level-two guest, the second level-two guest does not encounter DAT exceptions when attempting to access entries in a TLB for the second level-two guest. In addition, the first level-two guest should encounter DAT exceptions when attempting to access entries in the TLB of the first level-two guest.

The first and second level-two guests enter SIE, and at block 906 execute an instruction stream that generates TLB entries on the master processor 902 and the slave processors 904. The first and second level-two guests then exit SIE. At block 908, the master processor 902 executes a selective TLB purge instruction to purge TLB entries for the first level-two guest. The first and second level-two guests enter SIE, and block 910 the first level-two guest executes an instruction stream of fetch and store instructions and, if the selective purge at block 908 was successful, the second level-two guest will encounter host DAT exceptions. In addition, if the selective purge at block 908 is operating as expected, TLB entries of the second level-two guest should not be impacted by the selective TLB purge at block 908. This is verified by the second level-two guest executing fetch & store instructions at block 912.

Figure 10:
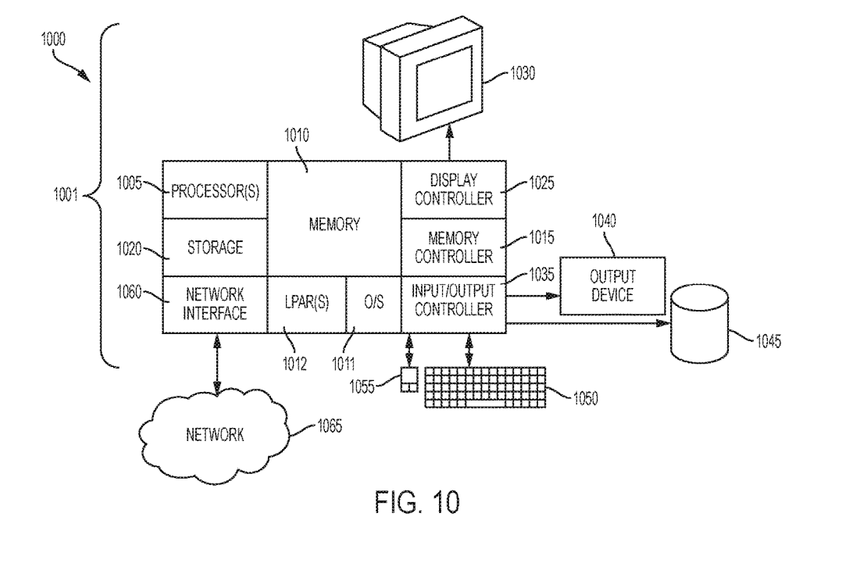
FIG. 10 illustrates a computer system for verifying selective TLB purging in accordance with one or more embodiments.

Turning now to FIG. 10, a computer system for verifying selective TLB purging is generally shown in accordance with one or more embodiments. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 1000 therefore may include general-purpose computer or mainframe 1001 capable of running multiple instances of an O/S simultaneously.

In an exemplary embodiment, in terms of hardware architecture, as shown in FIG. 10, the computer 1001 includes one or more processors 1005, memory 1010 coupled to a memory controller 1015, and one or more input and/or output (I/O) devices 1040, 1045 (or peripherals) that are communicatively coupled via a local input/output controller 1035. The input/output controller 1035 can be, for example but not limited to, one or more buses or other wired or wireless connections, as is known in the art. The input/output controller 1035 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 1035 may include a plurality of sub-channels configured to access the output devices 1040 and 1045. The sub-channels may include fiber-optic communications ports.

The processor 1005 is a hardware device for executing software, particularly that stored in storage 1020, such as cache storage, or memory 1010. The processor 1005 can be any custom made or commercially available processor, a central processing unit (CPU), an auxiliary processor among several processors associated with the computer 1001, a semiconductor based microprocessor (in the form of a microchip or chip set), a macroprocessor, or generally any device for executing instructions.

The memory 1010 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1010 may incorporate electronic, magnetic, optical, and/or other types of storage media. Note that the memory 1010 can have a distributed architecture, where various components are situated remote from one another, but can be accessed by the processor 1005.

The instructions in memory 1010 may include one or more separate programs, each of which comprises an ordered listing of executable instructions for implementing logical functions. In the example of FIG. 10, the instructions in the memory 1010 a suitable operating system (OS) 1011. The operating system 1011 essentially controls the execution of other computer programs and provides scheduling, input-output control, file and data management, memory management, and communication control and related services.

The memory 1010 may include multiple logical partitions (LPARs) 1012, each running an instance of an operating system. The LPARs 1012 may be managed by a hypervisor, which may be a program stored in memory 1010 and executed by the processor 1005.

In an exemplary embodiment, a conventional keyboard 1050 and mouse 1055 can be coupled to the input/output controller 1035. Other output devices such as the I/O devices 1040, 1045 may include input devices, for example but not limited to a printer, a scanner, microphone, and the like. Finally, the I/O devices 1040, 1045 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1000 can further include a display controller 1025 coupled to a display 1030. In an exemplary embodiment, the system 1000 can further include a network interface 1060 for coupling to a network 1065. The network 1065 can be an IP-based network for communication between the computer 1001 and any external server, client and the like via a broadband connection. The network 1065 transmits and receives data between the computer 1001 and external systems. In an exemplary embodiment, network 1065 can be a managed IP network administered by a service provider. The network 1065 may be implemented in a wireless fashion, e.g., using wireless protocols and technologies, such as WiFi, WiMax, etc. The network 1065 can also be a packet-switched network such as a local area network, wide area network, metropolitan area network, Internet network, or other similar type of network environment. The network 1065 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1001 is a PC, workstation, intelligent device or the like, the instructions in the memory 1010 may further include a basic input output system (BIOS) (omitted for simplicity). The BIOS is a set of essential software routines that initialize and test hardware at startup, start the OS 1011, and support the transfer of data among the hardware devices. The BIOS is stored in ROM so that the BIOS can be executed when the computer 1001 is activated.

When the computer 1001 is in operation, the processor 1005 is configured to execute instructions stored within the memory 1010, to communicate data to and from the memory 1010, and to generally control operations of the computer 1001 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
building multiple logical systems in a computing environment, the multiple logical systems including at least two level-two guests;
creating translation look-aside buffer (TLB) entries in a TLB for the level-two guests by executing fetch and store instructions;
purging a subset of the TLB entries in response to a selective TLB purge instruction, the subset including TLB entries created for a first one of the level-two guests;
in response to the purging:
verifying that the subset of the TLB entries were purged from the TLB; and
determining whether a second one of the level-two guests is operational, the determining including executing at least one instruction that accesses a TLB entry of the second one of the level-two guests;
generating test results based on the verifying and the determining; and
outputting the test results.

2. The method of claim 1, wherein the verifying includes the first one of the level-two guests executing a fetch and store instruction to access at least one of the TLB entries in the subset, and the executing returning an error condition.

3. The method of claim 1, wherein:
the at least one instruction that accesses a TLB entry of the second one of the level-two guests includes a fetch and store instruction to access at least one of the TLB entries not in the subset;
the second one of the level-two guests is determined to be operational based on the executing completing successfully; and
the second one of the level-two guests is determined not to be operational based on the executing returning an error condition.

4. The method of claim 1, wherein the computing environment is a uni-processor environment.

5. The method of claim 1, wherein the computing environment is a multi-processor environment, the first one of the level-two guests spans multiple processors, the TLB includes a TLB on each of the multiple processors, and the subset of the TLB entries spans multiple processors.

6. The method of claim 1, wherein the purging is performed by a processor that executes the first one of the level-two guests.

7. The method of claim 1, wherein the purging is performed by a processor that does not execute the first one of the level-two guests.

8. A system comprising:
a memory having computer readable instructions; and
a processor for executing the computer readable instructions, the computer readable instructions including:
building multiple logical systems in a computing environment, the multiple logical systems including at least two level-two guests;
creating translation look-aside buffer (TLB) entries in a TLB for the level-two guests by executing fetch and store instructions;
purging a subset of the TLB entries in response to a selective TLB purge instruction, the subset including TLB entries created for a first one of the level-two guests;
in response to the purging:
verifying that the subset of the TLB entries were purged from the TLB; and
determining whether a second one of the level-two guests is operational, the determining including executing at least one instruction that accesses a TLB entry of the second one of the level-two guests;
generating test results based on the verifying and the determining; and
outputting the test results.

9. The system of claim 8, wherein the verifying includes the first one of the level-two guests executing a fetch and store instruction to access at least one of the TLB entries in the subset, and the executing returning an error condition.

10. The system of claim 8, wherein:
the at least one instruction that accesses a TLB entry of the second one of the level-two guests includes a fetch and store instruction to access at least one of the TLB entries not in the subset;
the second one of the level-two guests is determined to be operational based on the executing completing successfully; and
the second one of the level-two guests is determined not to be operational based on the executing returning an error condition.

11. The system of claim 8, wherein the computing environment is a uni-processor environment.

12. The system of claim 8, wherein the computing environment is a multi-processor environment, the first one of the level-two guests spans multiple processors, the TLB includes a TLB on each of the multiple processors, and the subset of the TLB entries spans multiple processors.

13. The system of claim 8, wherein the purging is performed by a processor that executes the first one of the level-two guests.

14. The system of claim 8, wherein the purging is performed by a processor that does not execute the first one of the level-two guests.

15. A computer program product comprising a computer readable storage medium having program instructions embodied therewith, the program instructions executable by processing circuitry to cause the processing circuitry to perform:
building multiple logical systems in a computing environment, the multiple logical systems including at least two level-two guests;
creating translation look-aside buffer (TLB) entries in a TLB for the level-two guests by executing fetch and store instructions;
purging a subset of the TLB entries in response to a selective TLB purge instruction, the subset including TLB entries created for a first one of the level-two guests;
in response to the purging:
 verifying that the subset of the TLB entries were purged from the TLB; and
 determining whether a second one of the level-two guests is operational, the determining including executing at least one instruction that accesses a TLB entry of the second one of the level-two guests;
generating test results based on the verifying and the determining; and
outputting the test results.

16. The computer program product of claim 15, wherein the verifying includes the first one of the level-two guests executing a fetch and store instruction to access at least one of the TLB entries in the subset, and the executing returning an error condition.

17. The computer program product of claim 15, wherein:
the at least one instruction that accesses a TLB entry of the second one of the level-two guests includes a fetch and store instruction to access at least one of the TLB entries not in the subset;
the second one of the level-two guests is determined to be operational based on the executing completing successfully; and
the second one of the level-two guests is determined not to be operational based on the executing returning an error condition.

18. The computer program product of claim 15, wherein the computing environment is a uni-processor environment.

19. The computer program product of claim 15, wherein the computing environment is a multi-processor environment, the first one of the level-two guests spans multiple processors, the TLB includes a TLB on each of the multiple processors, and the subset of the TLB entries spans multiple processors.

20. The computer program product of claim 15, wherein the purging is performed by a processor that does not execute the first one of the level-two guests.

* * * * *